United States Patent
Ho

(10) Patent No.: US 10,289,590 B2
(45) Date of Patent: May 14, 2019

(54) ELECTRONIC DEVICE AND METHOD OF AUTO SWITCHING LINKING PATH GIVING PRIORITY TO A PRIORITY PORT

(71) Applicant: GETAC TECHNOLOGY CORPORATION, Hsinchu County (TW)

(72) Inventor: Chi-En Ho, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 15/783,991

(22) Filed: Oct. 13, 2017

(65) Prior Publication Data

US 2019/0114277 A1    Apr. 18, 2019

(51) Int. Cl.
| | |
|---|---|
| G06F 13/40 | (2006.01) |
| G06F 13/364 | (2006.01) |
| G06F 11/30 | (2006.01) |
| G06F 1/28 | (2006.01) |
| G06F 13/42 | (2006.01) |

(52) U.S. Cl.
CPC ............ *G06F 13/4022* (2013.01); *G06F 1/28* (2013.01); *G06F 11/3027* (2013.01); *G06F 11/3051* (2013.01); *G06F 13/364* (2013.01); *G06F 13/4282* (2013.01); *G06F 11/3048* (2013.01)

(58) Field of Classification Search
CPC combination set(s) only.
See application file for complete search history.

(56) References Cited

U.S. PATENT DOCUMENTS

| | | | |
|---|---|---|---|
| 2010/0161842 A1* | 6/2010 | Shan | ............ G06F 1/3209 710/18 |
| 2015/0160674 A1* | 6/2015 | Burdette | ............ G05F 1/66 700/295 |
| 2016/0197783 A1* | 7/2016 | Hort | ............ H04L 69/18 709/222 |

\* cited by examiner

*Primary Examiner* — Raymond N Phan

(57) ABSTRACT

An electronic device includes a priority port, an initial port, a system unit a linking control circuit and a priority detection circuit. The linking control circuit usually establishes a first linking path between the initial port and the system unit. The priority detection circuit detects a connection state of the priority port. When detecting that the priority port is connected to a first external device, the priority detection circuit makes the linking control circuit to disconnect the first linking path and establish a second linking path between the priority port and the system unit.

10 Claims, 5 Drawing Sheets

ELECTRONIC DEVICE AND METHOD OF AUTO SWITCHING LINKING PATH GIVING PRIORITY TO A PRIORITY PORT

BACKGROUND OF THE INVENTION

Field of the Invention

The present invention relates to technology of controlling linking paths and, more particularly, to an electronic device capable of auto-switching linking paths and a method of auto-switching linking paths.

Description of the Prior Art

The bus specification which electronic devices are most likely to come with is universal serial bus (USB). A conventional specification of USB is a protocol of master-slave framework. Therefore, it is only when an electronic device serving as a master apparatus connects with an electronic device serving as a slave apparatus that data transmission can occur. If both electronic devices are only capable of serving as a slave apparatus, data transmission must take place between the two electronic devices through a third electronic device which serves as a master apparatus and functions as a transmission agent. In recent years, USB OTG (On-The-Go) technology, which evolves from USB 2.0, enables one of the two electronic devices to serve as both a master apparatus and a slave apparatus in the absence of the third electronic device serving as a master apparatus, with a view to effectuating data transmission between the two electronic devices, for example, end-to-end data transmission between a cellular phone, a USB flash drive, and a digital camera.

The OTG technology does not apply to a port of a conventional electronic device if the port has a special (such as military) specification. Therefore, to effectuate data transmission between a first electronic device and a second electronic device by the OTG technology, users must connect the second electronic device to an OTG-enabled USB, rather than a port with a special specification, of the first electronic device.

SUMMARY OF THE INVENTION

In an embodiment, an electronic device comprises a priority port, an initial port, a system unit, a linking control circuit, and a priority detection circuit. The linking control circuit normally creates a first linking path between the initial port and the system unit. The priority detection circuit detects a connection state of the priority port. The priority detection circuit causes the linking control circuit to disconnect the first linking path and create a second linking path between the priority port and the system unit upon detection that the priority port is connected to a first external device.

In an embodiment, a method of auto-switching linking paths, applicable to an electronic device, comprises the steps of: detecting a connection state of a priority port of the electronic device; and disconnecting a first linking path between an initial port and a system unit of the electronic device and creating a second linking path between the priority port and the system unit upon detection that the priority port is connected to a first external device.

In conclusion, an electronic device and a method of auto-switching linking paths according to an embodiment of the present invention are characterized by detecting a connection state of a priority port, and linking, upon detection that an external device is connected to the priority port, to the priority port a system unit which is otherwise linked to an initial port, thereby allowing the external device to communicate with the system unit of the electronic device through the priority port. Moreover, the electronic device and the method of auto-switching linking paths according to an embodiment of the present invention are characterized in that, owing to the auto-switching of linking paths, the external device communicates with the electronic device not only by being coupled to the initial port to apply the OTG technology but also by being directly coupled to the priority port to apply the OTG technology.

The features and advantages of the present invention are detailed hereinafter with reference to the preferred embodiments. The detailed description is intended to enable persons skilled in the art to gain insight into the technical contents disclosed herein and implement the present invention accordingly. In particular, persons skilled in the art can easily understand the objectives and advantages of the present invention by referring to the disclosure of the specification, the claims, and the accompanying drawings.

DETAILED DESCRIPTION OF THE EMBODIMENTS

Figure 1:
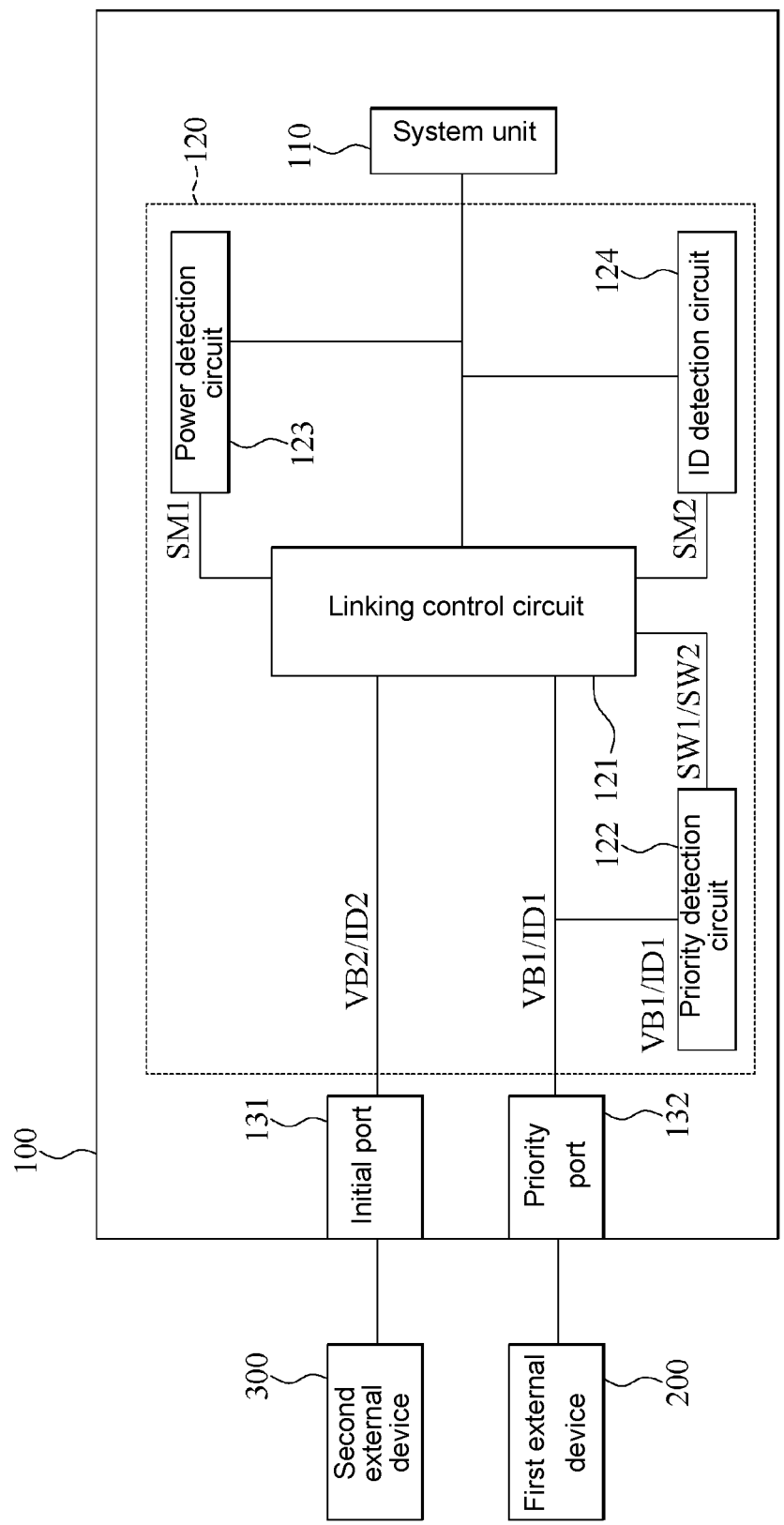
FIG. 1 is a block diagram of an electronic device according to an embodiment of the present invention.

FIG. 1 is a block diagram of an electronic device 100 according to an embodiment of the present invention. Referring to FIG. 1, the electronic device 100 comprises at least two ports, a system unit 110, a linking control circuit 121, and a priority detection circuit 122. The description below is exemplified by two ports but is not restrictive of the present invention in terms of the quantity of the ports. The two ports are hereinafter referred to as the initial port 131 and the priority port 132, respectively. The priority detection circuit 122 is coupled to the priority port 132. The linking control circuit 121 is coupled to the system unit 110, the initial port 131, the priority port 132, and the priority detection circuit 122.

The initial port 131 connects with a second external device 300 with a corresponding type of port so as to enable communication between the electronic device 100 and the second external device 300. The priority port 132 connects with a first external device 200 with a corresponding type of port so as to enable communication between the electronic device 100 and the first external device 200. The initial port 131 is plugged into and thus connected to the port of the second external device 300. The initial port 131 is unplugged from and thus disconnected from the port of the second external device 300. The priority port 132 is plugged into and thus connected to the port of the first external device 200. The priority port 132 is unplugged from and thus disconnected from the port of the first external device 200.

In some embodiments, the priority port 132 is different from the initial port 131 in terms of the type of ports. For instance, the initial port 131 is a universal serial bus (USB) port, whereas the priority port 132 is a military connector which meets military specifications, but the present invention is not limited thereto.

Figure 2:
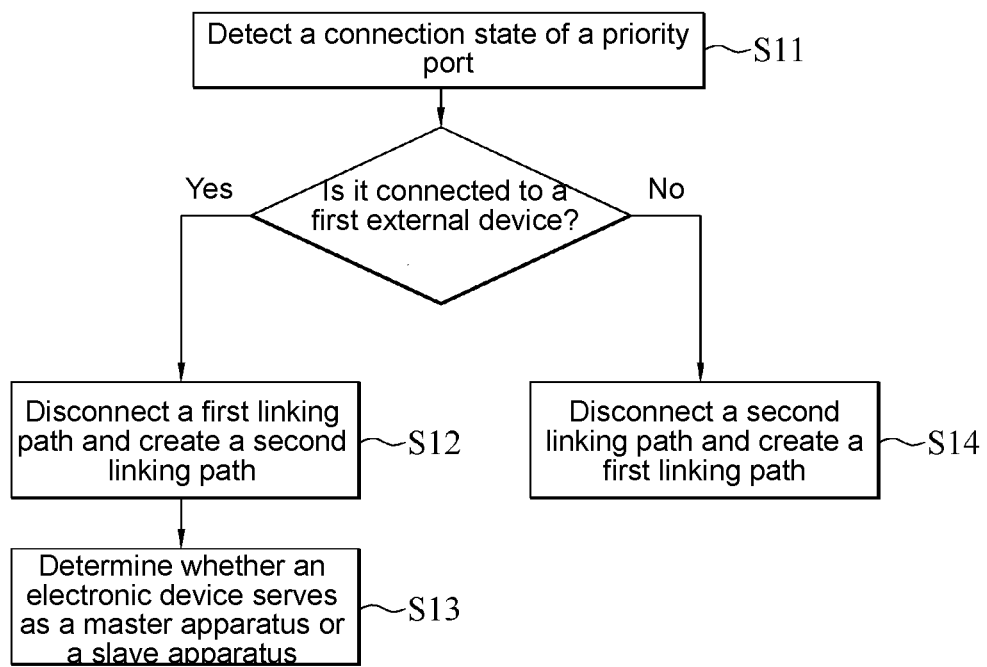
FIG. 2 is a flowchart of a priority port-related part of a method of auto-switching linking paths according to an embodiment of the present invention.
Figure 3:
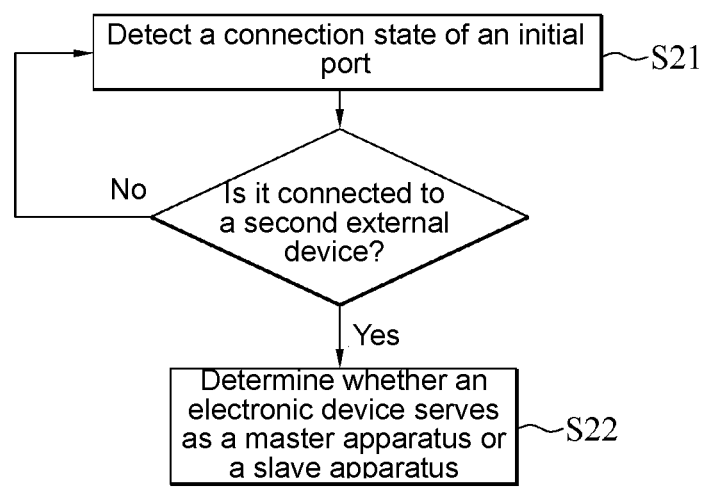
FIG. 3 is a flowchart of an initial port-related part of the method of auto-switching linking paths according to an embodiment of the present invention.

FIG. 2 is a flowchart of a priority port-related part of a method of auto-switching linking paths according to an embodiment of the present invention. FIG. 3 is a flowchart of an initial port-related part of the method of auto-switching linking paths according to an embodiment of the present invention. Referring to FIG. 1 through FIG. 3, the electronic device 100 creates a linking path between the initial port 131 and the system unit 110 or creates a linking path between the priority port 132 and the system unit 110 by the method of auto-switching linking paths according to any one of embodiments of the present invention. The linking path created between the initial port 131 and the system unit 110 is hereinafter referred to as the first linking path. The linking path created between the priority port 132 and the system unit 110 is hereinafter referred to as the second linking path.

In an embodiment, the electronic device 100 normally creates the first linking path between the initial port 131 and the system unit 110 and disconnects the second linking path between the priority port 132 and the system unit 110 by the linking control circuit 121.

In an embodiment of the method of auto-switching linking paths, the electronic device 100 detects a connection state of the priority port 132 by the priority detection circuit 122 (step S11) to detect whether the first external device 200 is connected to the priority port 132. If the priority detection circuit 122 detects that the first external device 200 is connected to the priority port 132, the linking control circuit 121 of the electronic device 100 disconnects the first linking path and creates the second linking path between the priority port 132 and the system unit 110 (step S12).

In an embodiment, the priority detection circuit 122 of the electronic device 100 performs step S11 repeatedly, and it is only when the priority detection circuit 122 does not detect connection of the first external device 200 to the priority port 132 that the electronic device 100 detects a connection state of the initial port 131 (step S21) to confirm whether the second external device 300 is connected to the initial port 131.

In an embodiment, while step S21 is ongoing, the priority detection circuit 122 of the electronic device 100 performs step S11 to keep detecting whether the first external device 200 is connected to the priority port 132 and, upon detection that the first external device 200 is connected to the priority port 132, the electronic device 100 goes to step S12. Hence, the link of the priority port 132 has priority over the link of the initial port 131. Therefore, even though the first external device 200 is connected to the priority port 132 and the second external device 300 is connected to the initial port 131 concurrently, the linking control circuit 121 of the electronic device 100 creates the second linking path between the priority port 132 and the system unit 110 and disconnects the first linking path, and in consequence only the first external device 200 connected to the priority port 132 communicates with the system unit 110.

In an embodiment, when connected to the priority port 132 of the electronic device 100, the first external device 200 determines whether to send a power signal VB1 or an ID signal ID1 to the priority port 132 of the electronic device 100 according to a role, namely a master apparatus (master) or a slave apparatus (client), which the first external device 200 is going to play in operation. Similarly, when connected to the initial port 131 of the electronic device 100, the second external device 300 determines whether to send a power signal VB2 or an ID signal ID2 to the initial port 131 of the electronic device 100 according to a role, namely a master apparatus (master) or a slave apparatus (client), which the second external device 300 is going to play in operation.

In an embodiment of step S11, the electronic device 100 determines whether the first external device 200 is connected to the priority port 132 according to whether the priority detection circuit 122 receives the power signal VB1 or the ID signal ID1 through the priority port 132. If the priority detection circuit 122 receives one of the power signal VB1 and the ID signal ID1 through the priority port 132, the priority detection circuit 122 generates and sends switch signal SW1 to the linking control circuit 121 so that, in step S12 and according to switch signal SW1, the linking control circuit 121 disconnects the first linking path normally created between the initial port 131 and the system unit 110 and creates the second linking path between the priority port 132 and the system unit 110, thereby allowing the first external device 200 linked to the priority port 132 to communicate with the system unit 110 through the second linking path.

In an embodiment, the electronic device 100 further comprises a power detection circuit 123 and an ID detection circuit 124. The power detection circuit 123 is coupled to the linking control circuit 121 for creating a linking path between the linking control circuit 121 and the system unit 110. The ID detection circuit 124 is coupled to the linking control circuit 121 for creating a linking path between the linking control circuit 121 and the system unit 110. The power detection circuit 123 detects a power signal received through the linking path created by the linking control circuit 121 so as to generate and send a result signal SM1 to the linking control circuit 121 according to a result of detection. The ID detection circuit 124 detects an ID signal received through the linking path created by the linking control circuit 121 so as to generate and send a result signal SM2 to the linking control circuit 121 according to a result of detection.

Therefore, in an embodiment effectuated upon completion of step S12, the linking control circuit 121 of the electronic device 100 identifies the role played by the first external device 200 coupled to the priority port 132 according to the result signal SM1 of the power detection circuit 123 and the result signal SM2 of the ID detection circuit 124 and determines the role it is going to play (step S13).

In an embodiment of step S13, to play the role of a master apparatus, the first external device 200 sends the power signal VB1 to the priority port 132. Therefore, the power detection circuit 123 generates and sends the result signal SM1 indicative of detection of the power signal VB1 to the linking control circuit 121; hence, the result signal SM1 informs the linking control circuit 121 that the electronic device 100 is going to play the role of a slave apparatus and thus causes the electronic device 100 to serve as a slave apparatus—for example, the electronic device 100 sends through the priority port 132 its ID signal to the first external device 200 connected to the priority port 132.

In another embodiment of step S13, to play the role of a slave apparatus, the first external device 200 sends the ID signal ID1 to the priority port 132. Therefore, the ID detection circuit 124 generates and sends the result signal SM2 indicative of detection of the ID signal ID1 to the linking control circuit 121; hence, the result signal SM2 informs the linking control circuit 121 that the electronic device 100 is going to play the role of a master apparatus and thus causes the electronic device 100 to serve as a master apparatus—for example, the electronic device 100 sends through the priority port 132 its power signal to the first external device 200 connected to the priority port 132.

In an embodiment, if the priority detection circuit 122 fails to receive the power signal VB1 or the ID signal ID1 through the priority port 132, this means either the first external device 200 has already separated from the priority port 132 (upon completion of step S12) or the first external device 200 is not connected to the priority port 132; hence, the priority detection circuit 122 generates and sends a second switch signal SW2 to the linking control circuit 121, thereby causing the linking control circuit 121 to disconnect the second linking path and create the first linking path according to the second switch signal SW2 (step S14). If, before step S14, the linking control circuit 121 creates the first linking path and disconnects the second linking path, the linking control circuit 121 does not operate during the step, and in consequence the linking control circuit 121 keeps the first linking path available and the second linking path disconnected.

In an embodiment of step S21, with the first linking path being normally created between the initial port 131 and the system unit 110, the linking control circuit 121 of the electronic device 100 uses the power detection circuit 123 and the ID detection circuit 124 to detect and determine whether the second external device 300 is coupled to the initial port 131. Specifically speaking, the linking control circuit 121 determines whether the second external device 300 is connected to the initial port 131 according to whether the power detection circuit 123 detects by the first linking path the power signal VB2 received from the second external device 200 through the initial port 131 or according to whether the ID detection circuit 124 detects by the first linking path the ID signal ID2 received from the second external device 200 through the initial port 131.

In an embodiment, if in step S21 the linking control circuit 121 of the electronic device 100 determines that the second external device 300 is connected to the initial port 131, the linking control circuit 121 of the electronic device 100 identifies the role played by the second external device 300 according to results of detection performed by the power detection circuit 123 and the ID detection circuit 124 and determines its role (step S22).

In an embodiment of step S22, to play the role of a master apparatus, the second external device 300 sends the power signal VB2 to the initial port 131. Therefore, the power detection circuit 123 generates and sends the result signal SM1 indicative of detection of the power signal VB2 to the linking control circuit 121; hence, the result signal SM1 informs the linking control circuit 121 that the electronic device 100 is going to play the role of a slave apparatus and thus causes the electronic device 100 to serve as a slave apparatus—for example, the electronic device 100 sends through the initial port 131 its ID signal to the second external device 300 connected to the initial port 131.

In another embodiment of step S22, to play the role of a slave apparatus, the second external device 300 sends the ID signal ID2 to the initial port 131. Therefore, the ID detection circuit 124 generates and sends the result signal SM2 indicative of detection of the ID signal ID2 to the linking control circuit 121; hence, the result signal SM2 informs the linking control circuit 121 that the electronic device 100 is going to play the role of a master apparatus and thus causes the electronic device 100 to serve as a master apparatus—for example, the electronic device 100 sends through the initial port 131 its power signal to the second external device 300 connected to the initial port 131.

Figure 4:
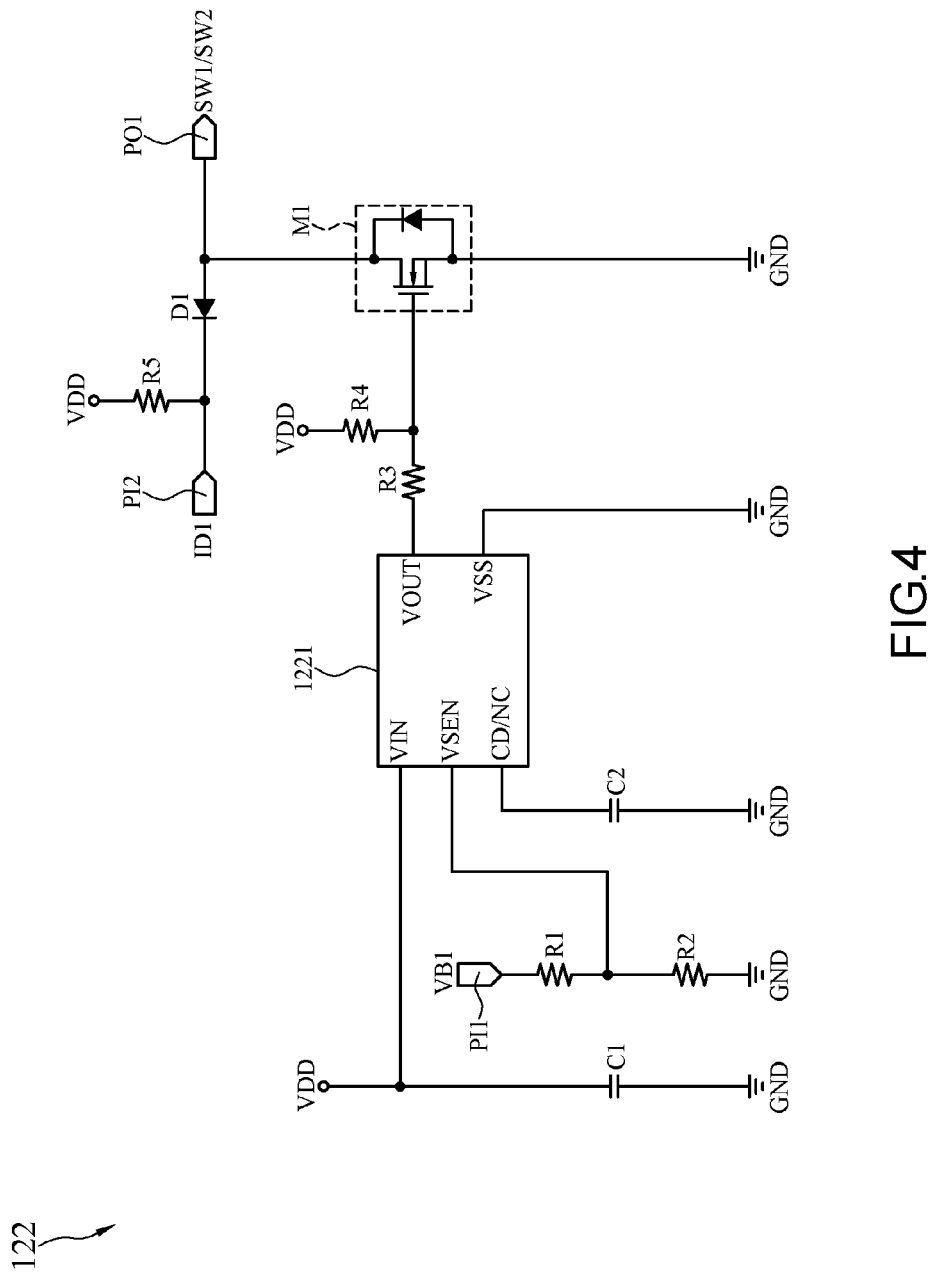
FIG. 4 is a schematic view of a priority detection circuit of FIG. 1 according to an embodiment of the present invention.

FIG. 4 is a schematic view of the priority detection circuit 122 of FIG. 1 according to an embodiment of the present invention. Referring to FIG. 1 through FIG. 4, in an embodiment, the priority detection circuit 122 comprises a voltage detection module 1221, resistors R1-R5, capacitors C1-C2, diode D1, transistor M1, input pins P11, P12, and output pin PO1. The voltage detection module 1221 has a power end VIN, a detection end VSEN, a delay control end CD/NC, an output end VOUT, and a power end VSS.

The power end VIN of the voltage detection module 1221 is coupled to a power voltage VDD and a first end of capacitor C1, whereas a second end of capacitor C1 is coupled to a ground voltage GND. The detection end VSEN of the voltage detection module 1221 is coupled to a second end of resistor R1 and a first end of resistor R2, whereas a first end of resistor R1 is coupled to input pin P11. The delay control end CD/NC of the voltage detection module 1221 is coupled to a first end of capacitor C2, whereas a second end of capacitor C2 is coupled to the ground voltage GND. The power end VSS of the voltage detection module 1221 is coupled to the ground voltage GND. The output end VOUT of the voltage detection module 1221 is coupled to a first end of resistor R3. A second end of resistor R3 is coupled to a second end of resistor R4 and the control end of transistor M1. A first end of resistor R4 is coupled to the power voltage VDD. A first end of transistor M1 is coupled to the anode end of diode D1 and output pin PO1. A second end of transistor M1 is coupled to the ground voltage GND. The cathode end of diode D1 is coupled to a second end of resistor R5 and input pin P12, whereas a first end of resistor R5 is coupled to the power voltage VDD.

Input pin P11 is coupled to the priority port 132 and receives the power signal VB1 sent from the first external device 200 through the priority port 132 (if the first external device 200 serves as a master apparatus.) Input pin P12 is coupled to the priority port 132 and receives the ID signal ID1 sent from the first external device 200 through the priority port 132 (if the first external device 200 serves as a slave apparatus.) Output pin PO1 is coupled to the linking control circuit 121 and sends switch signal SW1 (or switch signal SW2) to the linking control circuit 121. If a voltage detected by the detection end VSEN is higher than a threshold level, the voltage detection module 1221 causes the voltage of the output end VOUT to change from an OFF level to an ON level.

In an embodiment, in the situation where the first external device 200 sends the power signal VB1 to the priority port 132, if the voltage detected by the detection end VSEN is higher than a threshold level, the voltage detection module 1221 of the priority detection circuit 122 outputs an ON level through the output end VOUT to not only cause transistor M1 to turn on but also cause the first end of transistor M1 to generate switch signal SW1. The level of switch signal SW1 is reduced to an OFF level because transistor M1 has turned on. In another embodiment, when the first external device 200 sends the ID signal ID1 to the priority port 132, diode D1 of the priority detection circuit 122 is turned on, and in consequence the anode end of diode D1 generates switch signal SW1 with an OFF level, but the present invention is not limited thereto.

Figure 5:
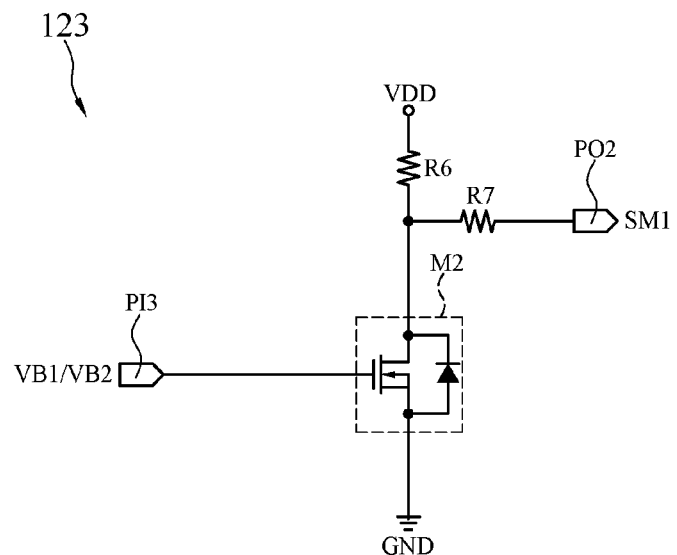
FIG. 5 is a schematic view of a power detection circuit of FIG. 1 according to an embodiment of the present invention.

FIG. 5 is a schematic view of a power detection circuit of FIG. 1 according to an embodiment of the present invention.

Referring to FIG. 1 through FIG. 5, in an embodiment, the power detection circuit 123 comprises resistors R6-R7, transistor M2, input pin P13, and output pin PO2. The control end of transistor M2 is coupled to input pin P13. A first end of transistor M2 is coupled to a second end of resistor R6 and a first end of resistor R7, whereas a second end of transistor M2 is coupled to the ground voltage GND. A first end of resistor R6 is coupled to the power voltage VDD. A second end of resistor R7 is coupled to output pin PO2.

Input pin P13 is coupled to the linking path between the linking control circuit 121 and the system unit 110. Input pin P13 receives during the time period when the first linking path is created and through the first linking path the power signal VB2 sent from the second external device 300 through the initial port 131 and receives during the time period when the second linking path is created and through the second linking path the power signal VB1 sent from the first external device 200 through the priority port 132. Output pin PO2 is coupled to the linking control circuit 121 and sends the result signal SM1 to the linking control circuit 121.

In an embodiment, if the power signal VB1 or the power signal VB2 is received by the control end of transistor M2, transistor M2 turns on, and output pin PO2 generates the result signal SM1 with an OFF level. If the control end of transistor M2 does not receive the power signal VB1 or the power signal VB2, transistor M2 turns off, and output pin PO2 generates the result signal SM1 with an ON level, but the present invention is not limited thereto.

Figure 6:
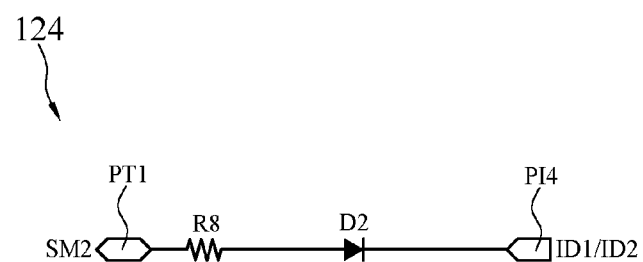
FIG. 6 is a schematic view of an ID detection circuit of FIG. 1 according to an embodiment of the present invention.

FIG. 6 is a schematic view of the ID detection circuit 124 of FIG. 1 according to an embodiment of the present invention. Referring to FIG. 1 through FIG. 6, in an embodiment, the ID detection circuit 124 comprises resistor R8, diode D2, input pin P14, and transmission pin PT1. A first end of resistor R8 is coupled to transmission pin PT1, whereas a second end of resistor R8 is coupled to the anode end of diode D2. The cathode end of diode D2 is coupled to input pin P14.

Input pin P14 is coupled to the linking path between the linking control circuit 121 and the system unit 110. Input pin P14 receives during a time period when the first linking path is created and through the first linking path the ID signal 1D2 transmitted from the second external device 300 through the initial port 131 and receives during a time period when the second linking path is created and through the second linking path the ID signal ID1 transmitted from the first external device 200 through the priority port 132. Input pin P14 is coupled to the linking control circuit 121 and transmits the result signal SM2 to the linking control circuit 121.

In an embodiment, if input pin P14 receives the ID signal ID1 or the ID signal ID2, diode D2 turns on, and input pin P14 coupled to the anode end of diode D2 generates the result signal SM2 indicative of receipt of the ID signal ID1 or the ID signal ID2. For instance, in the situation where the initial level of the result signal SM2 is an ON level, if the ID signal ID1 or the ID signal ID2, which has an OFF level, is received by input pin P14, the level of the result signal SM2 is reduced to the OFF level, because diode D2 has turned on, thereby informing the linking control circuit 121 that the electronic device 100 serves as a master apparatus, but the present invention is not limited thereto.

In some embodiments, transistors M1-M2 are provided in the form of N-type transistors, but the present invention is not limited thereto.

In some embodiments, the system unit 110 is a core circuit, such as a central processing unit (CPU) or a microprocessor, of the electronic device 100. The linking control circuit 121 is provided in the form of a combination of a multiplexer (MUX) and an embedded controller (EC). Moreover, the linking control circuit 121, the priority detection circuit 122, the power detection circuit 123, and the ID detection circuit 124 together form an OTG (On-The-Go) control circuit 120 which operates by the OTG control technology and thus enables the electronic device 100 to serve as a master apparatus or a slave apparatus, but the present invention is not limited thereto.

In conclusion, an electronic device and a method of auto-switching linking paths according to an embodiment of the present invention are characterized by detecting a connection state of a priority port, and linking, upon detection that an external device is connected to the priority port, to the priority port a system unit which is otherwise linked to an initial port, thereby allowing the external device to communicate with the system unit of the electronic device through the priority port. Moreover, the electronic device and the method of auto-switching linking paths according to an embodiment of the present invention are characterized in that, owing to the auto-switching of linking paths, the external device communicates with the electronic device not only by being coupled to the initial port to apply the OTG technology but also by being directly coupled to the priority port to apply the OTG technology.

Although the present invention is disclosed above by preferred embodiments, the preferred embodiments are not restrictive of the present invention. Changes and modifications made by persons skilled in the art to the preferred embodiments without departing from the spirit of the present invention must be deemed falling within the scope of the present invention. Accordingly, the legal protection for the present invention should be defined by the appended claims.

What is claimed is:

1. An electronic device, comprising:
    a priority port;
    an initial port;
    a system unit;
    a linking control circuit coupled between the priority port, the initial port, and the system unit and adapted to normally connect a first linking path between the initial port and the system unit and disconnect a second linking path between the priority port and the system unit; and
    a priority detection circuit coupled to the priority port and the linking control circuit to detect a connection state of the priority port, and configured such that upon detection that the priority port is connected to a first external device, the linking control circuit disconnects the first linking path and connects the second linking path;
    wherein, when the second linking path is connected, the second linking path enables communication between the priority port and the first external device, and when the first linking path is connected and a second external device is connected to the initial port, the first linking path enables communication between the initial port and the second external device.

2. The electronic device of claim 1, wherein, after the second linking path has been connected, the priority detection circuit causes the linking control circuit to disconnect the second linking path and connect the first linking path only upon detection of separation of the priority port and the first external device.

3. The electronic device of claim 1, wherein the priority detection circuit determines whether the priority port is connected to the first external device by detecting one of an ID signal and a power signal received through the priority port.

4. The electronic device of claim 1, further comprising:
a power detection circuit for detecting a power signal received through one of the initial port and the priority port, wherein the linking control circuit determines that the electronic device serves as a slave apparatus upon detection of the power signal; and
an ID detection circuit for detecting an ID signal received through one of the initial port and the priority port, wherein the linking control circuit determines that the electronic device serves as a master apparatus upon detection of the ID signal.

5. A method of auto-switching linking paths, applicable to an electronic device having an initial port and a priority port, a first linking path that is normally connected between the initial port and a system unit, and a second linking path between the priority port and the system unit that is by default disconnected, the method comprising the steps of:
detecting a connection state of the priority port of the electronic device; and
disconnecting the first linking path between the initial port and the system unit of the electronic device and connecting the second linking path upon detection that the priority port is connected to a first external device;
wherein, when the second linking path is connected, the second linking path enables communication between the priority port and the first external device, and when the first linking path is connected and a second external device is connected to the initial port, the first linking path enables communication between the initial port and the second external device.

6. The method of claim 5, further comprising the step of disconnecting the second linking path and connecting the first linking path only upon detection of separation of the priority port and the first external device.

7. The method of claim 5, wherein the step of detecting the connection state of the priority port includes determining whether the priority port is connected to the first external device by detecting one of an ID signal and a power signal received through the priority port and determining that the priority port is connected to the first external device upon detection of one of the power signal and the ID signal received through the priority port.

8. The method of claim 5, further comprising the steps of:
detecting whether the priority port receives one of a power signal and an ID signal when the second linking path is connected;
determining that the electronic device serves as a slave apparatus upon detection that the priority port receives the power signal; and
determining that the electronic device serves as a master apparatus upon detection that the priority port receives the ID signal.

9. The method of claim 5, further comprising the step of determining whether the initial port is connected to the second external device by detecting one of a power signal and an ID signal received through the initial port and determining that the initial port is connected to the second external device by detecting one of the power signal and the ID signal received through the initial port, when the first linking path is connected.

10. The method of claim 5, further comprising the steps of:
detecting whether the initial port receives one of a power signal and an ID signal when the first linking path is connected;
determining that the electronic device serves as a slave apparatus upon detection that the initial port receives the power signal; and
determining that the electronic device serves as a master apparatus upon detection that the initial port receives the ID signal.

* * * * *